United States Patent
Denda et al.

(10) Patent No.: US 6,882,493 B2
(45) Date of Patent: Apr. 19, 2005

(54) DATA RECORDING APPARATUS AND DATA ERASING APPARATUS CAPABLE OF PERFORMING RESTORATION WHEN POWER SUPPLY MALFUNCTION OCCURS DURING RECORDING OR ERASING

(75) Inventors: Akihiro Denda, Kawagoe (JP); Yoshiya Nonaka, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 183 days.

(21) Appl. No.: 10/162,159

(22) Filed: Jun. 3, 2002

(65) Prior Publication Data

US 2002/0181136 A1 Dec. 5, 2002

(30) Foreign Application Priority Data

Jun. 4, 2001 (JP) ................................. P2001-167942

(51) Int. Cl.[7] ............................................. G11B 27/10
(52) U.S. Cl. ................................. 360/69; 711/207
(58) Field of Search ............................... 360/69, 48, 49; 707/204, 205; 711/4, 112, 200, 202, 205, 207

(56) References Cited

U.S. PATENT DOCUMENTS

| | | | | |
|---|---|---|---|---|
| 5,930,467 A | * | 7/1999 | Morita | 711/100 |
| 6,212,097 B1 | * | 4/2001 | Kihara et al. | 365/185.04 |
| 6,269,420 B1 | * | 7/2001 | Horie | 711/103 |
| 6,378,031 B1 | * | 4/2002 | Kuno et al. | 711/4 |
| 6,411,552 B1 | * | 6/2002 | Chiba | 711/200 |
| 2001/0051954 A1 | | 12/2001 | Yamashita | 707/200 |

FOREIGN PATENT DOCUMENTS

| | | |
|---|---|---|
| EP | 0 971 358 A2 | 1/2000 |
| EP | 1 172 817 A2 | 1/2002 |
| JP | 63040949 A * | 2/1988 |

OTHER PUBLICATIONS

Tweedie, S., "Journaling The Linux ext2FS Filesystem" *Linuxexpo '98,* INTERNET: <http://www.osdever.net/docs/journal–design.pdf?the_id=38> pp. 1–8 (Feb. 16, 2004).

* cited by examiner

*Primary Examiner*—Sinh Tran
*Assistant Examiner*—James L Habermehl
(74) *Attorney, Agent, or Firm*—Ladas & Parry LLP

(57) ABSTRACT

A data recording apparatus is provided with: a recording device which includes a data recording region having data recorded in a predetermined unit, a first management data region having management data with respect to the data recorded in the data recording region, stored in the predetermined unit, and a second management data region having the same management data as that stored in the first management data region, stored in the predetermined unit; a control device which performs, in the predetermined unit, control processing including a record processing for recording data in the data recording region and an update processing for updating management data in the first management data region and the second management data region; and a memory which stores status data indicating a control processing status in the predetermined unit by the control device.

14 Claims, 13 Drawing Sheets

FIG. 3

NONVOLATILE MEMORY 41

| ADDRESS | STATUS DATA | |
|---|---|---|
| | SEQUENCE | PROCESSING STATE FLAG |
| A0001 | NO | C |
| A0002 | YES | B |
| A0003 | YES | B |
| B0001 | NO | A |
| B0002 | · | · |
| B0003 | · | · |
| B0004 | · | · |
| C0001 | · | · |
| C0002 | · | · |
| C0003 | · | · |
| C0004 | · | · |
| C0005 | · | · |
| ····· | | |

FIG.5A
FIG.5B
FIG.5C
FIG.5D

FIG. 7A UPON POWER SHUTDOWN
FIG. 7B
FIG. 7C AFTER RESTORATION

FIG. 8A
UPON POWER SHUTDOWN

HDD 23

| | | | | |
|---|---|---|---|---|
| FAT1 | 000F | 0001 | 0002 | FFFF ... |
| FAT2 | 000F | 0001 | 0002 | 0000 ... |
| DATA RECORDING REGION | XXXX | YYYYY | YYYYY | YYYYY ...... |

NONVOLATILE MEMORY 41

| ADDRESS | STATUS DATA | |
|---|---|---|
| | SEQUENCE | PROCESSING STATE FLAG |
| A0001 | NO | C |
| A0002 | YES | B |
| A0003 | YES | B |
| B0001 | NO | A |
| ...... | | |

⇩ POWER SHUTDOWN

FIG. 8B

| | | | | |
|---|---|---|---|---|
| FAT1 | 000F | 0001 → 0001 | 0002 | FFFF ... |
| FAT2 | 000F | 0001 | 0002 | 0000 ... |
| DATA RECORDING REGION | XXXX | YYYYY | YYYYY | YYYYY ...... |

| ADDRESS | SEQUENCE | PROCESSING STATE FLAG |
|---|---|---|
| A0001 | NO | C |
| A0002 | YES | B |
| A0003 | YES | A |
| B0001 | NO | A |
| ...... | | |

| | | | | |
|---|---|---|---|---|
| FAT1 | 000F | 0001 | 0002 | FFFF ... |
| FAT2 | 000F | 0001 | 0002 | FFFF → FFFF ... |
| DATA RECORDING REGION | XXXX | YYYYY | YYYYY | YYYYY ...... |

| ADDRESS | SEQUENCE | PROCESSING STATE FLAG |
|---|---|---|
| A0001 | NO | C |
| A0002 | YES | C |
| A0003 | YES | C |
| B0001 | NO | A |
| ...... | | |

AFTER RESTORATION

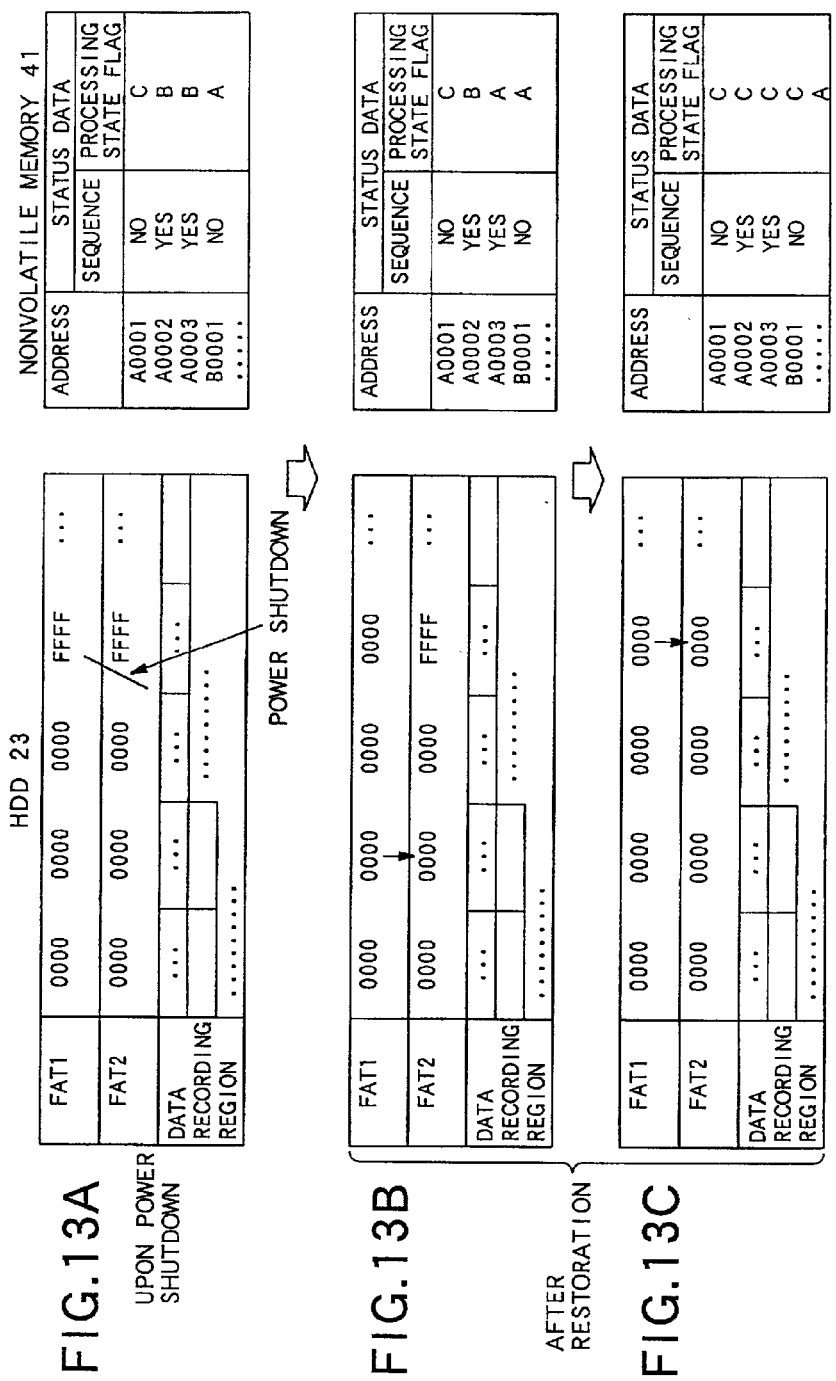

DATA RECORDING APPARATUS AND DATA ERASING APPARATUS CAPABLE OF PERFORMING RESTORATION WHEN POWER SUPPLY MALFUNCTION OCCURS DURING RECORDING OR ERASING

BACKGROUND OF THE INVENTION

1. Field of the Invention

The present invention relates to the technical field of an apparatus capable of proper restoration even if a trouble such as shutdown of power supply occurs during recording or erasing data.

2. Description of the Related Art

In a hard disk (hereinafter referred to as "an HDD") included in a personal computer or the like as standard equipment, data has been conventionally recorded in a unit of a cluster (which is a minimum unit in recording data in the disk). Data having too large a capacity to be recorded in one cluster is separately stored in a plurality of clusters. In the HDD, the use status of the clusters is managed based on a file allocation table (hereinafter abbreviated as "an FAT"). Therefore, the data is read, written or erased along a chain of clusters based on information stored in the FAT. Consequently, if the FAT is broken, the data recorded in the HDD cannot be read out. As the countermeasures against this, the HDD includes two FATs, i.e., a main FAT and a sub FAT, so that as soon as the main FAT is updated, the sub FAT can be automatically updated. As a result, even if a severe accident occurs while the FAT is rewritten, such an inconvenience that the contents of the HDD cannot be read out is prevented as possible.

In the case where a trouble such as power shutdown of power supply occurs during recording or erasing the data in the conventional personal computer or the like, disk scanning has been known as one of restoring measures thereafter. By such disk scanning, deficient data within a data recording region is searched by looking into the entire FAT region. The deficient data is consistently restored each time the deficient data is detected. Furthermore, if the main FAT and the sub FAT are inconsistent with each other, they are made to be consistent with each other.

However, since the entire FAT region is looked into in the above-described disk scanning, it takes much time to restore all of the data, and moreover, there is no guarantee that the data per se can be securely restored since the FAT region per se is possibly broken. Even if the above-described disk scanning is applied to a recording apparatus equipped with the HDD, it takes much time to look into the entire FAT region and search the deficient data.

Additionally, for example, if the trouble such as the power shutdown of the power supply occurs while a music stream is recorded in the HDD, a data recording region becomes out of unconformity. That is to say, the music stream is recorded in a cluster unit in the data recording region, so that the data cannot be recorded in a cluster in which the data is to be recorded if the FAT region is broken at the time of restoration. Thus, the data lacks of the feature of a stream.

SUMMARY OF THE INVENTION

It is therefore an object of the present invention to provide a data recording apparatus and a data erasing apparatus in which data can be accurately restored in a short time even if a trouble such as power shutdown of power supply occurs while the data is recorded or erased.

The above object of the present invention can be achieved by the data recording apparatus provided with: a recording device which includes a data recording region having data recorded in a predetermined unit, a first management data region having management data with respect to the data recorded in the data recording region, stored in the predetermined unit, and a second management data region having the same management data as that stored in the first management data region, stored in the predetermined unit; a control device which performs, in the predetermined unit, control processing including a record processing for recording data in the data recording region and an update processing for updating management data in the first management data region and the second management data region; and a memory which stores status data indicating a control processing status in the predetermined unit by the control device.

According to the present invention, the data recording apparatus is configured such that status data indicating a control processing status is stored in a predetermined unit by a control device, so that restoring measures can be taken in reference to the status data in the predetermined unit even if a trouble of power supply such as power shutdown occurs during, for example, a data recording processing, thereby accurately restoring the data in a short time.

In one aspect of the data recording apparatus of the present invention, the control device updates the management data stored in the first management data region by the predetermined unit as the data in the predetermined unit is recorded in the data recording region, and further, updates the management data stored in the second management data region by the predetermined unit to the same management data as the updated management data stored in the first management data region.

According this aspect, the data record processing and management data update processing according to the data record processing can be performed in the predetermined unit, so that an appropriate processing can be performed when the restoring measures are taken.

In another aspect of the data recording apparatus of the present invention, the control device stores status data indicating a current processing status in the memory during the control processing.

According to this aspect, the statuses indicating the data record processing and the management data update processing according to the data record processing are stored in each of the predetermined units, so that the appropriate processing can be performed when the restoring measures are taken.

In further aspect of the data recording apparatus of the present invention, the control device stores status data indicating a start of the record processing in the memory when the record processing is started, and stores status data indicating a start of the update processing in the memory when the update processing for updating the management data in the second data management region, is started.

According to this aspect, the start of the data record processing and the start of the management data update processing are stored in the predetermined unit, so that the appropriate processing can be performed when the restoring measures are taken.

In further aspect of the data recording apparatus of the present invention, the control device refers to the status data recorded in the memory, and then, resumes the control processing in accordance with the processing status in the case where a trouble including a shutdown of power supply during the control processing occurs and the trouble is solved.

According to this aspect, the control processing can be resumed in a short time in accordance with the processing status in the predetermined unit even if the trouble of the power supply such as the power shutdown occurs during the data record processing.

In further aspect of the data recording apparatus of the present invention, wherein the control device duplicates the management data stored in the second management data region to the first management data region, and then, resumes the control processing in the case where the processing status indicates the start of the record processing.

According to this aspect, in the case where the processing status indicates the start of the record processing, the management data stored in a second management data region is duplicated to a first management data region, and thus, the data record control processing can be speedily resumed from the predetermined unit concerned.

In further aspect of the data recording apparatus of the present invention, the control device duplicates the management data stored in the first management data region to the second management data region, and then, resumes the control processing in the case where the processing status indicates the start of the update processing.

According to this aspect, the data recording in the predetermined unit concerned has been normally ended in the case where the processing status indicates the start of the update processing, thus speedily resuming the management data duplicating processing from the first management data region to the second management data region.

In further aspect of the data recording apparatus of the present invention, the control device stores status data indicating an end of the update processing in the memory in the case where the update processing for updating the management data in the second management data region, is ended.

According to this aspect, the end of the data record processing and the management data update processing in the predetermined unit concerned can be confirmed in reference to the status data indicating the end of the update processing.

The above object of the present invention can be achieved by the data erasing apparatus provided with: a recording device which includes a data recording region having data to be erased in a predetermined unit, a first management data region having management data with respect to the data recorded in the data recording region, stored in the predetermined unit, and a second management data region having the same management data as that stored in the first management data region, stored in the predetermined unit; a control device which performs, in the predetermined unit, control processing including an erasure processing for erasing data from the data recording region and an update processing for updating management data in the first management data region and the second management data region; and a memory which stores status data indicating a control processing status in the predetermined unit by the control device.

According to the present invention, the data erasing apparatus is configured such that status data indicating a control processing status is stored in a predetermined unit by a control device, so that restoring measures can be taken in reference to the status data in the predetermined unit even if a trouble of power supply such as power shutdown occurs during, for example, a data erasure processing, thereby accurately restoring the data in a short time.

In one aspect of the data erasing apparatus of the present invention, the control device updates the management data stored in the first management data region by the predetermined unit as the data in the predetermined unit is erased from the data recording region, and further, updates the management data stored in the second management data region by the predetermined unit to the same management data as the updated management data stored in the first management data region.

According to this aspect, the data erasure processing and management data update processing according to the data erasure processing can be performed in the predetermined unit, so that an appropriate processing can be performed when the restoring measures are taken.

In another aspect of the data erasing apparatus of the present invention, the control device stores status data indicating a current processing status in the memory during the control processing.

According to this aspect, the statuses indicating the data erasure processing and the management data update processing according to the data record processing are stored in each of the predetermined units, so that the appropriate processing can be performed when the restoring measures are taken.

In further aspect of the data erasing apparatus of the present invention, the control device stores status data indicating a start of the erasure processing in the memory when the erasure processing is started, and stores status data indicating a start of the update processing in the memory when the update processing for updating the management data in the second data management region, is started.

According to this aspect, the start of the data erasure processing and the start of the management data update processing are stored in the predetermined unit, so that the appropriate processing can be performed when the restoring measures are taken.

In further aspect of the data erasing apparatus of the present invention, the control device refers to the status data recorded in the memory, and then, resumes the control processing in accordance with the processing status in the case where a trouble including a shutdown of power supply during the control processing occurs and the trouble is solved.

According to this aspect, the control processing can be resumed in a short time in accordance with the processing status in the predetermined unit even if the trouble of the power supply such as the power shutdown occurs during the data erasing processing.

In further aspect of the data erasing apparatus of the present invention, the control device duplicates the management data stored in the second management data region to the first management data region, and then, resumes the control processing in the case where the processing status indicates the start of the erasure processing.

According to this aspect, in the case where the processing status indicates the start of the erasure processing, the management data stored in a second management data region is duplicated to a first management data region, and thus, the data erasing control processing can be speedily resumed from the predetermined unit concerned.

In further aspect of the data erasing apparatus of the present invention, the control device duplicates the management data stored in the first management data region to the second management data region, and then, resumes the control processing in the case where the processing status indicates the start of the update processing.

According to this aspect, the data erasing in the predetermined unit concerned has been normally ended in the case where the processing status indicates the start of the update processing, thus speedily resuming the management data duplicating processing from the first management data region to the second management data region.

In further aspect of the data erasing apparatus of the present invention, the control device stores status data indicating an end of the update processing in the memory in the case where the update processing for updating the management data in the second management data region, is ended.

According to this aspect, the end of the data erasure processing and the management data update processing in the predetermined unit concerned can be confirmed in reference to the status data indicating the end of the update processing.

BRIEF DESCRIPTION OF THE DRAWINGS

FIG. 3 is a chart illustrating an example of status data stored in a nonvolatile memory 41;

FIGS. 5A to 5D are charts conceptually illustrating the audio data recording and management data updating in the HDD 23 in the processing illustrated in FIG. 4 and status data storing in the nonvolatile memory 41;

FIGS. 7A to 7C are charts conceptually illustrating the data recording and the management data updating in the HDD 23 and the status data storing in the nonvolatile memory 41 in the case where the system controller 40 performs a restoration processing after the trouble of the power supply such as the power shutdown has occurred while the data is recorded in the data recording region;

FIGS. 8A to 8C are charts conceptually illustrating the data recording and the management data updating in the HDD 23 and the status data storing in the nonvolatile memory 41 in the case where the system controller 40 performs a restoration processing after the trouble of the power supply such as the power shutdown has occurred while management data is duplicated from the FAT 1 to the FAT 2;

FIGS. 12A to 12C are charts conceptually illustrating the data erasing and the management data updating in the HDD 23 and the status data storing in the nonvolatile memory 41 in the case where the system controller 40 performs the restoration processing after the trouble of the power supply such as the power shutdown has occurred while the data is erased from the data recording region; and FIGS. 13A to 13C are charts conceptually illustrating the data erasing and the management data updating in the HDD 23 and the status data storing in the nonvolatile memory 41 in the case where the system controller 40 performs the restoration processing after the trouble of the power supply such as the power shutdown has occurred while the management data is duplicated from the FAT 1 to the FAT 2.

DETAILED DESCRIPTION OF THE PREFERRED EMBODIMENT

Figure 1:
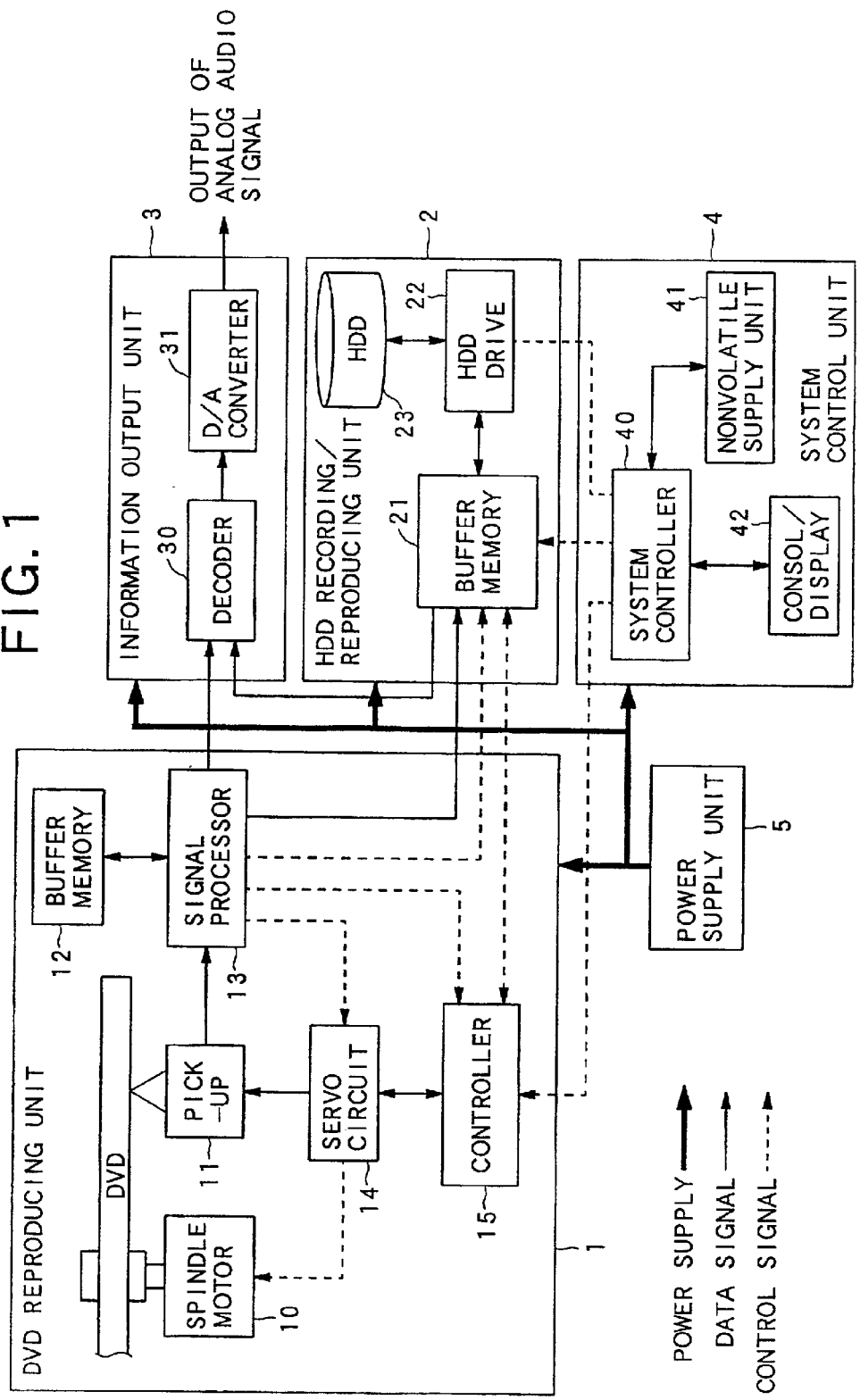
FIG. 1 is a diagram illustrating an example of a schematic arrangement of an audio apparatus 100 in a preferred embodiment according to the present invention.

A preferred embodiment according to the present invention will be described below in reference to the attached drawings. Here, a description will be given below of the preferred embodiment in which the present invention is applied to an audio apparatus. FIG. 1 is a diagram illustrating an example of a schematic arrangement of an audio apparatus 100 in the present embodiment according to the present invention. As illustrated, the audio apparatus 100 in the present embodiment is provided with: a DVD (a Digital Video Disk or a Digital Versatile Disk) reproducing unit 1 for reproducing, as audio data, recording information recorded in a DVD serving as an information recording medium; an HDD recording/reproducing unit 2 for recording, reproducing the audio data transmitted from the DVD reproducing unit 1; an information output unit 3 in charge of an output processing of the audio data; a system control unit 4 in charge of an operation control of each of the above-described constituent units; and a power supply unit 5 for supplying power to the above-described constituent units.

The DVD reproducing unit 1 includes: a spindle motor 10 for rotating the DVD carried to a predetermined clamping position at a constant linear velocity; a pickup 11 for optically reading the recording information recorded in the DVD; a signal processor 13 for demodulating the recording data read by the pickup 11, and further, for supplying the audio data contained in the recording data which has been time-division-multiplexed to the HDD recording/reproducing unit 2 and the information output unit 3 via a buffer memory 12; a servo circuit 14 for servo-controlling the spindle motor 10 and the pickup 11 in response to a tracking error signal or the like output from the signal processor 13; and a controller 15 for controlling the entire operation of the DVD reproducing unit 1. Furthermore, the controller 15 performs a proper synchronous reproduction in accordance with an instruction output from the system control unit 4. Here, the DVD reproducing unit 1 has been well known and has no direct bearing on the present invention, and therefore, the detailed description thereof will be omitted below. Moreover, although the DVD reproducing unit 1 is used in the present embodiment, a CD (the acronym of a compact disk) reproducing unit or the like may be used.

The information output unit 3 is provided with a decoder 30 and a D/A converter 31. The decoder 30 is adapted to extend the audio data output from the DVD reproducing unit 1 or the HDD recording/reproducing unit 2. Thereafter, the D/A converter 31 converts the extended data into an analog audio signal, and then, outputs it to an amplifier and a speaker.

The HDD recording/reproducing unit 2 includes a buffer memory 21, an HDD drive 22 and an HDD 23 serving as a recording device. The audio data output from the DVD reproducing unit 1 is temporarily stored in the buffer memory 21, and then, is recorded in the HDD 23 via the HDD drive 22.

Figure 2:
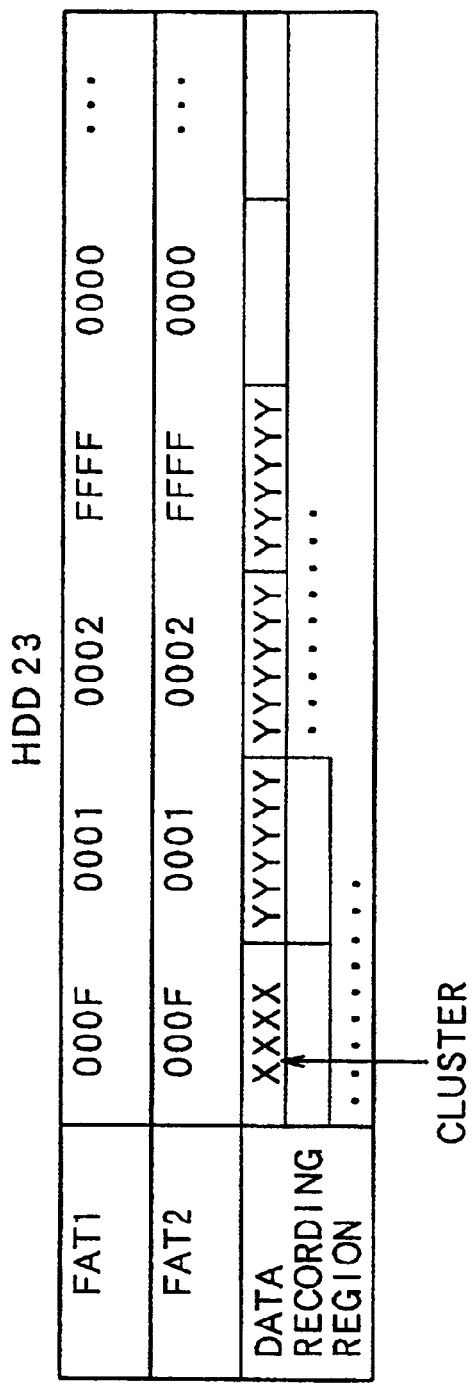
FIG. 2 is a chart conceptually illustrating a data recording region, an FAT 1 and an FAT 2 in an HDD 23.

The HDD 23 includes a data recording region, in which the audio data is recorded in a predetermined unit (hereinafter referred to as "a block"); a first management data region (hereinafter referred to as "an FAT 1") for storing management data for managing a recording status or the like in the above-described predetermined unit; and a second management data region (hereinafter referred to as "an FAT 2") for storing the management data stored in the FAT 1 in the above-described predetermined unit. FIG. 2 is a chart conceptually illustrating the data recording region, the FAT 1 and the FAT 2 in the HDD 23. As illustrated, the audio data is recorded per cluster in the data recording region; in contrast, the management data is recorded in each of the FAT 1 and the FAT 2 in a manner corresponding to the data per cluster.

Moreover, in the description below, one block signifies one cluster unit and one stream unit (i.e., a unit over a plurality of clusters). For example, in the data recording region illustrated in FIG. 2, audio data "XXXX" in one cluster forms one block; and further, another audio data "YYYY . . . " in one stream over three clusters forms one block. Namely, the plurality of sequent clusters form one stream in unit. Incidentally, the audio data is recorded or erased per block in the data recording region, as described later.

The system control unit 4 includes a system controller 40 serving as a control device consisting of a CPU having an arithmetic function, a ROM, an operating RAM and the like; a nonvolatile memory 41 such as an EEPROM; and a operation/display 42 having operation buttons for inputting instructions from a user or a display for displaying predetermined information.

The system controller 40 is adapted to control the entire apparatus based on a program stored in the ROM, and further, is equipped with a control processing function of performing, per block, a record processing of the audio data in the data recording region in the HDD 23 and an update processing of the management data to the FAT 1 and the FAT 2 in the HDD 23 at that time. Additionally, the system controller 40 is equipped with another control processing function of performing, per block, an erasure processing of the audio data from the data recording region in the HDD 23 and the update processing of the management data to the FAT 1 and the FAT 2 in the HDD 23 at that time.

Furthermore, the system controller 40 stores a status in each step in the above-described control processing as status data in the nonvolatile memory 41. FIG. 3 is a chart illustrating an example of the status data stored in the nonvolatile memory 41. As illustrated, the status data corresponds to an address of each of the clusters, and it includes the existence of sequence and a processing state flag. The sequence signifies the sequence of the clusters: "NO" designates that one block is completed with only that cluster without any sequence to a next cluster; to the contrary, "YES" designates that the sequence continues to a next cluster. In the meantime, the processing state flag indicates the status of the control processing of the system controller 40 in each of the clusters. Here, "A" denotes the start of the recording or erasing of the audio data and updating of the FAT 1; "B", the start of the updating of the FAT 2; and "C", the end of the recording, erasing and updating.

In this manner, the system controller 40 stores the status in each step in the control processing as the status data, thereby performing a proper restoration processing even if a trouble of power supply such as power shutdown occurs in the power supply unit 5 during the recording or erasing of the audio data.

Hereinafter, explanation will be made on the control processing of the system controller 40 when the audio data is recorded or erased.
(Recording of Audio Data)

Figure 4:
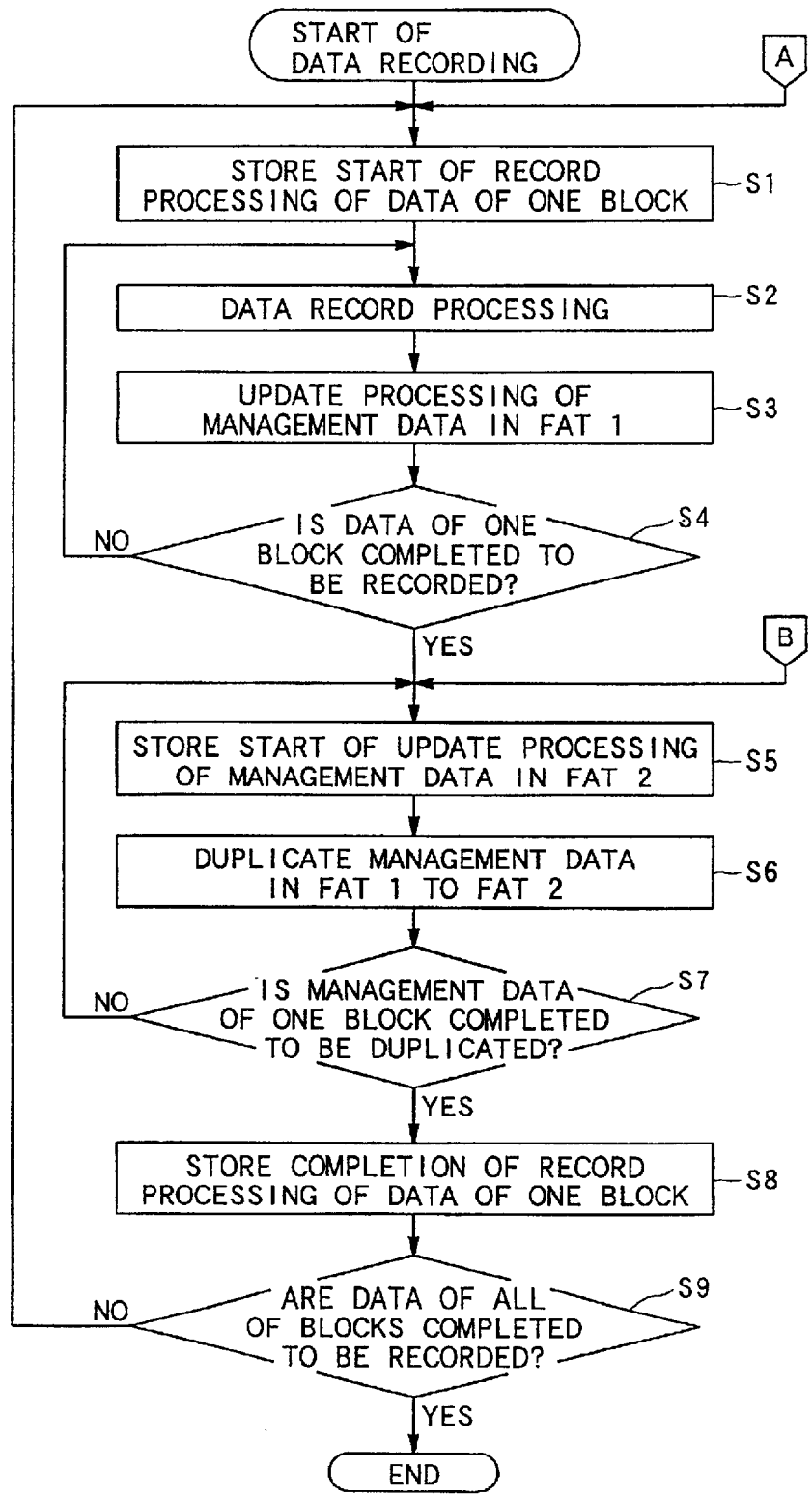
FIG. 4 is a flowchart illustrating control processing in a system controller 40 when audio data is recorded.

FIG. 4 is a flowchart illustrating the control processing in the system controller 40 when the audio data is recorded; and FIGS. 5A to 5D are charts conceptually illustrating the audio data recording and the management data updating in the HDD 23 in the processing illustrated in FIG. 4 and the status data storing in the nonvolatile memory 41. Incidentally, the audio data "YYYY . . . " in the above-described stream unit is exemplified in the following description.

In the control processing illustrated in FIG. 4, the system controller 40 gives an audio data reproducing instruction to the DVD reproducing unit 1 in accordance with a data recording instruction input by the user via the operation/display 42, and then, starts an audio data reproduction processing, and further, stores the processing state flag ("A") indicating the start of the record processing of the audio data (hereinafter, simply referred to as "the data") of one block in the nonvolatile memory 41 (step S1). For example, as designated by reference numeral 51 in FIG. 5A, the processing state flag ("A") corresponding to each of the clusters (addresses A0002, A0003 and B0001) in one block to be recorded is stored in the nonvolatile memory 41. Here, in the example illustrated in FIG. 5A, the data is started to be recorded in the data recording region in the HDD 23 from the cluster (the address A0002) designated by reference numeral 50.

Figures 5A, 5B, 5C, 5D:
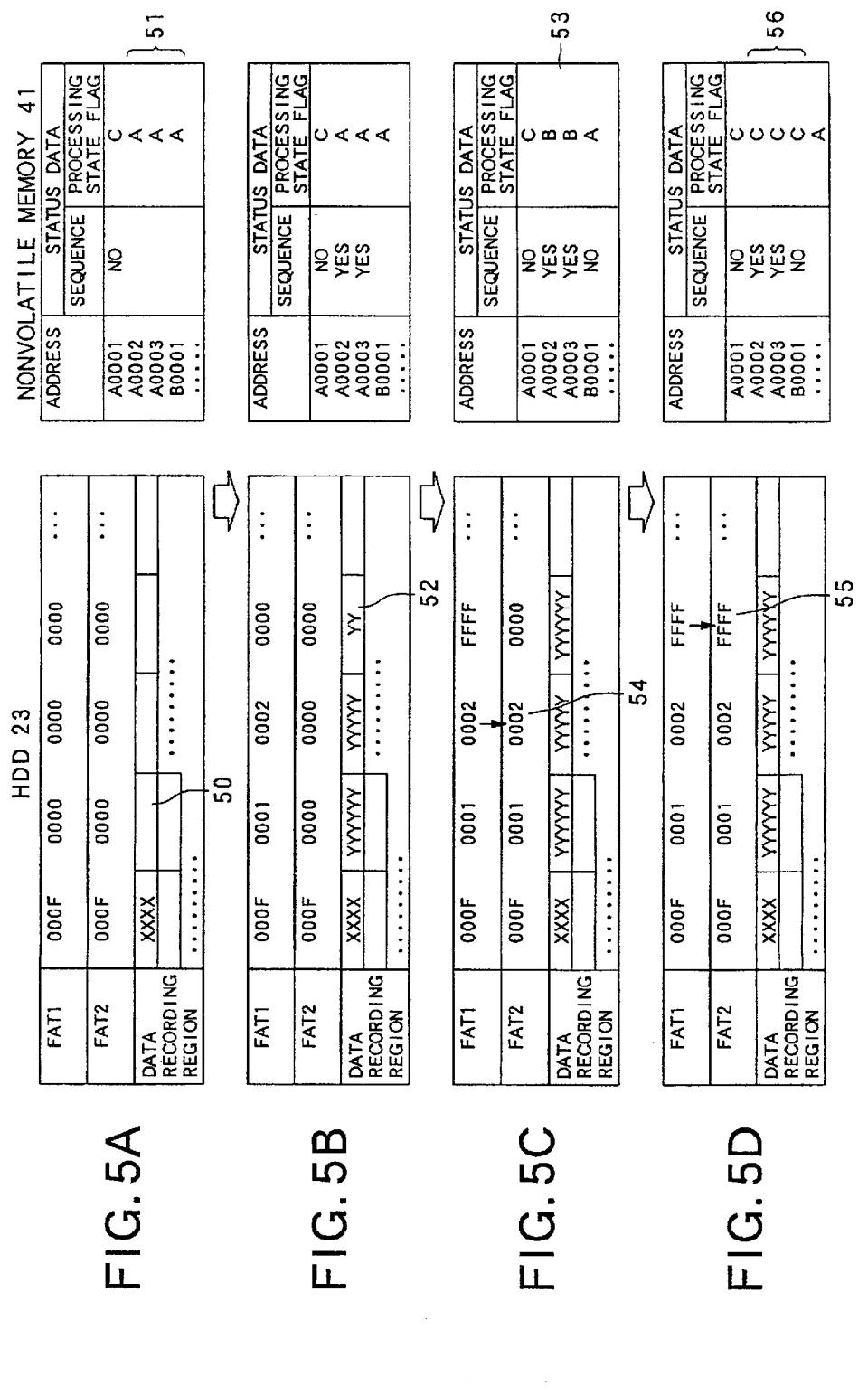

Subsequently, the system controller 40 performs a record processing for recording the data in the data recording region in the HDD 23 (step S2), and then, it performs an update processing for updating the management data in the FAT 1 corresponding to the above-described data (step S3). For example, as illustrated in FIG. 5B, when the data "YYYYYY" in a first cluster in the block concerned is recorded, the management data in the FAT 1 corresponding to the above-described data is updated from "0000" (indicating that no data is recorded) to "0001" (indicating that the data having the sequence is recorded). The sequence corresponding to the address A0002 becomes "YES".

Next, the system controller 40 judges as to whether or not the data of one block is completed to be recorded (step S4). Unless the data of one block has been completed to be recorded, the routine returns to step S2, in which next data is subjected to the record processing. For example, since the sequence of the cluster at the address A0002 is "YES", the data "YYYYYY" is recorded in a second cluster (i.e., the address A0003) of the block concerned, and then, the management data in the FAT 1 corresponding to the above-described data is updated from "0000" to "0002" (indicating that the data having the sequence is recorded), as illustrated in FIG. 5B. Thus, the sequence corresponding to the address A0003 becomes "YES".

In the meantime, if the data of one block has been completed to be recorded, the routine proceeds to step S5. For example, when the data in a last cluster designated by reference numeral 52 in FIG. 5B is completed to be recorded and the management data in the FAT 1 corresponding to the above-described data is updated, the sequence in the status data is recorded as "NO", and thus, the routine proceeds to step S5. Here, based on "NO" of the sequence of the status data, it is judged as to whether or not the data of one block is completed to be recorded and the management data in the FAT 1 is completed to be updated.

In step S5, the system controller 40 stores a processing state flag ("B") indicating a start of an update processing for updating the management data in the FAT 2 in the nonvolatile memory 41. And then, the system controller 40 duplicates the management data in the FAT 1 to the FAT 2 (step S6). For example, when the processing state flag ("B") at the address A0003 is stored, as designated by reference numeral 53 in FIG. 5C, the management data in the FAT 1 corresponding to the address A0003 is duplicated to the FAT 2, as designated by reference numeral 54.

In step S7, the system controller 40 judges as to whether or not the management data of one block is completed to be duplicated to the FAT 2. If the management data is completed to be duplicated, the routine proceeds to step S8. In contrast, unless the management data has been completed to be duplicated, the routine is repeated in steps S5 and S6 until all of the management data in one block are completed to be updated to the FAT 2.

In step S8, the system controller 40 stores, in the nonvolatile memory 41, a processing state flag ("C") indicating the completion of the record processing of the data of one block (i.e., the record processing in the data recording region and the update processing in the FAT 1 and the FAT 2). For example, in the case where the management data in the FAT 1 corresponding to the address B0001 is duplicated to the FAT 2 ("FFFF" indicates the completion of the data of one block), as designated by reference numeral 55 in FIG. 5D, the processing state flag ("C") corresponding to each of the clusters (the addresses A0002, A0003 and B0001) in one block to be recorded is stored in the nonvolatile memory 41, as designated by reference numeral 56.

Subsequently, the system controller 40 judges as to whether or not the data of all of the blocks to be recorded are completed to be recorded (step S9). Unless the data of all of the blocks have been completed to be recorded, the routine returns to step S1, and then, the data of a next block is subjected to the same processing as described above (i.e., from steps S1 to S8). In contrast, if the data of all of the blocks have been completed to be recorded, the routine comes to an end.

Figure 6:
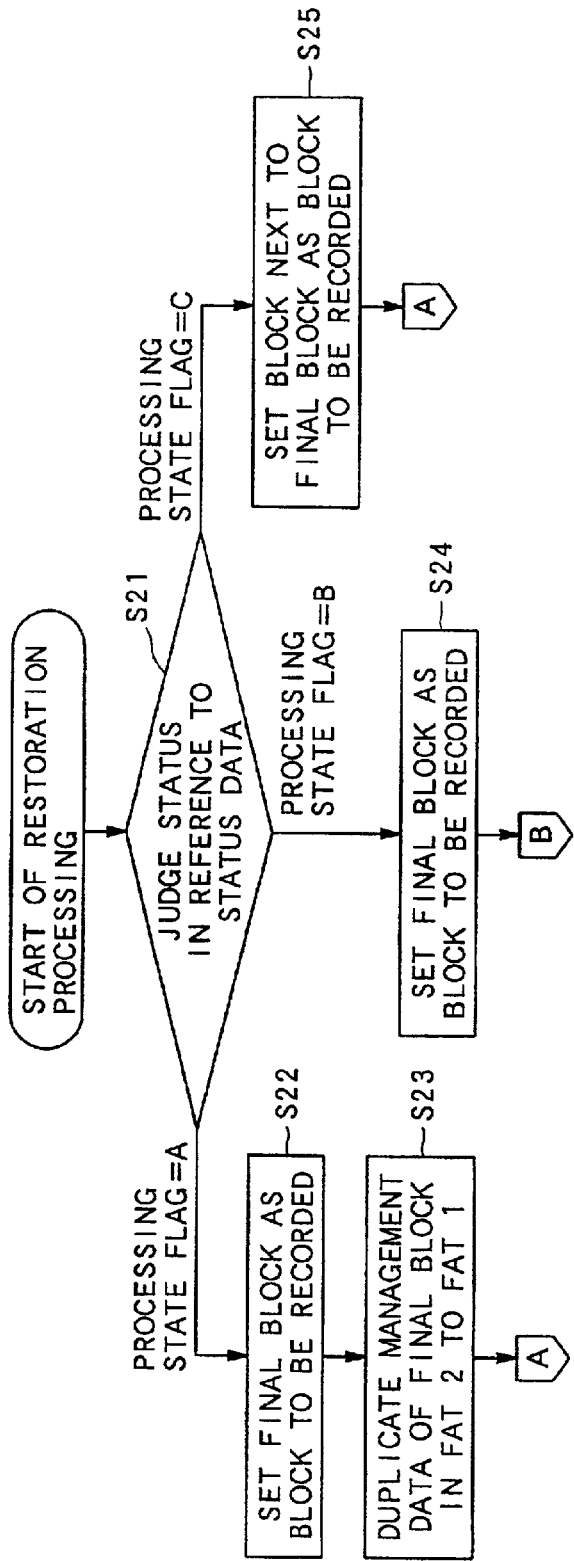
FIG. 6 is a flowchart illustrating a restoration processing by the system controller 40 in the case where a trouble of power supply such as power shutdown occurs during the data recording.

Next, referring to FIGS. 6 to 8, a description will be given below of restoring measures by the system controller 40 in the case where a trouble of power supply such as power shutdown occurs during the control processing by the system controller 40 at the time of the above-described data recording, and thereafter, the trouble of the power supply is solved. FIG. 6 is a flowchart illustrating a restoration processing by the system controller 40 in the case where the trouble of the power supply such as the power shutdown occurs during the data recording; FIGS. 7A to 7C are charts conceptually illustrating the data recording and the management data updating in the HDD 23 and the status data storing in the nonvolatile memory 41 in the case where the system controller 40 performs the restoration processing after the trouble of the power supply such as the power shutdown has occurred while the data is recorded in the data recording region; FIGS. 8A to 8C are charts conceptually illustrating the data recording and the management data updating in the HDD 23 and the status data storing in the nonvolatile memory 41 in the case where the system controller 40 performs the restoration processing after the trouble of the power supply such as the power shutdown has occurred while the management data is duplicated from the FAT 1 to the FAT 2.

When the trouble of the power supply such as the power shutdown occurs during the data recording, and thereafter, the trouble is solved, the system controller 40 starts the restoration processing. In the restoration processing, first, the system controller 40 refers to the status data stored in the nonvolatile memory 41, and then, judges the processing status of the final block being recorded (step S21). Specifically, in the case where all of the processing state flags corresponding to the blocks concerned are "A", the routine proceeds to step S22. Otherwise, in the case where the processing state flags corresponding to the blocks concerned include "B", the routine proceeds to step S24. Alternatively, in the case where all of the processing state flags corresponding to the blocks concerned are "C", the routine proceeds to step S25.

For example, in the case where the trouble of the power supply such as the power shutdown occurs while the data is recorded in the data recording region, all of the processing state flags corresponding to the final blocks (the addresses A0002, A0003 and B0001) are "A", as illustrated in FIG. 7A. In this case, the routine proceeds to step S22, in which the system controller 40 sets the above-described final blocks as blocks to be recorded, and then, it controls to resume the recording from the above-described final blocks. First of all, the system controller 40 outputs, to the controller 15 in the DVD reproducing unit 1, a signal indicating the occurrence of the trouble of the power supply such as the power shutdown while the data is recorded in the data recording region. The controller 15 controls the servo circuit 14 in response to the signal output from the system controller 40, and then, returns the pickup 11 to a leading position of the recording information of one block which has been reproduced upon the occurrence of the trouble of the power supply such as the power shutdown, so as to allow it to stand by there.

Subsequently, the system controller 40 duplicates, to the FAT 1, all of the management data of the final block in the FAT 2 (step S23), that is, returns the management data in the FAT 1 and the status data in the nonvolatile memory 41 to the state in which the final block is started to be recorded, as illustrated in FIG. 7B. Thus, the routine proceeds to step S1 illustrated in FIG. 4, as described above. In this manner, the system controller 40 outputs a signal indicating the completion of the above-described restoration processing to the controller 15 in the DVD reproducing unit 1, so that the reproduction is resumed in the DVD reproducing unit 1, and further, the data is resumed to be recorded from the cluster corresponding to the first address A0002 in the final block, as illustrated in FIG. 7C.

In the meantime, in the case where the trouble of the power supply such as the power shutdown occurs during the duplication of the management data from the FAT 1 to FAT 2, "B" is contained in any of the processing state flags corresponding to the final blocks (the addresses A0002, A0003 and B0001), as illustrated in FIG. 8A. In this case, the routine proceeds to step S24, in which the system controller 40 sets the above-described final block as a block to be recorded, and then, controls to resume the updating of the management data in the FAT 2 from the above-described final block. First of all, the system controller 40 outputs, to the controller 15 in the DVD reproducing unit 1, a signal indicating that the trouble of the power supply such as the power shutdown occurs during the duplication of the management data from the FAT 1 to FAT 2. The controller 15 controls the servo circuit 14 in response to the signal output from the system controller 40, so as to allow the pickup 11 to stand by at a reproducing position at the timing when the trouble of the power supply such as the power shutdown occurs. That is to say, since the reproduction of the recording information of one block has been completed at this timing, the pickup 11 is allowed to stand by at a leading position of the recording information of one block to be reproduced next. Consequently, the status data stored in the nonvolatile memory 41 is returned to the state before the FAT 2 is updated.

Subsequently, the routine by the system controller 40 proceeds to step S5 illustrated in FIG. 4. Thus, the processing is resumed from the duplication of the management data from the FAT 1 to the FAT 2 in the final block, as illustrated in FIGS. 8B and 8C.

Moreover, the system controller 40 outputs, to the controller 15 in the DVD reproducing unit 1, a signal indicating the completion of the duplication of the management data from the FAT 1 to the FAT 2, so that the reproduction of the recording information is resumed in the DVD reproducing unit 1, and further, the recording is resumed from the data of a block next to the final block.

In contrast, in the case where the trouble of the power supply such as the power shutdown occurs immediately after the processing state flag "C" indicating the completion of the record processing of the data of one block is stored in the nonvolatile memory 41, all of the processing state flags corresponding to the final blocks are "C". In this case, the routine proceeds to step S25, in which the system controller 40 sets a block next to the above-described final block as a block to be recorded, and then, controls to resume the record processing from the next block. First of all, the system controller 40 outputs, to the controller 15 in the DVD reproducing unit 1, a signal indicating that the trouble of the power supply such as the power shutdown occurs upon the completion of the recording processing of the data of one block. The controller 15 controls the servo circuit 14 in response to the signal output from the system controller 40, so as to resume the reproduction of the recording information from a reproducing position at the timing when the trouble of the power supply such as the power shutdown occurs, i.e., from a leading position of the recording information of one block to be reproduced next.

Subsequently, the routine by the system controller 40 proceeds to step S1 illustrated in FIG. 4. Thus, the recording is resumed from the data of the block next to the final block.

(Erasing of Audio Data)

Figure 9:
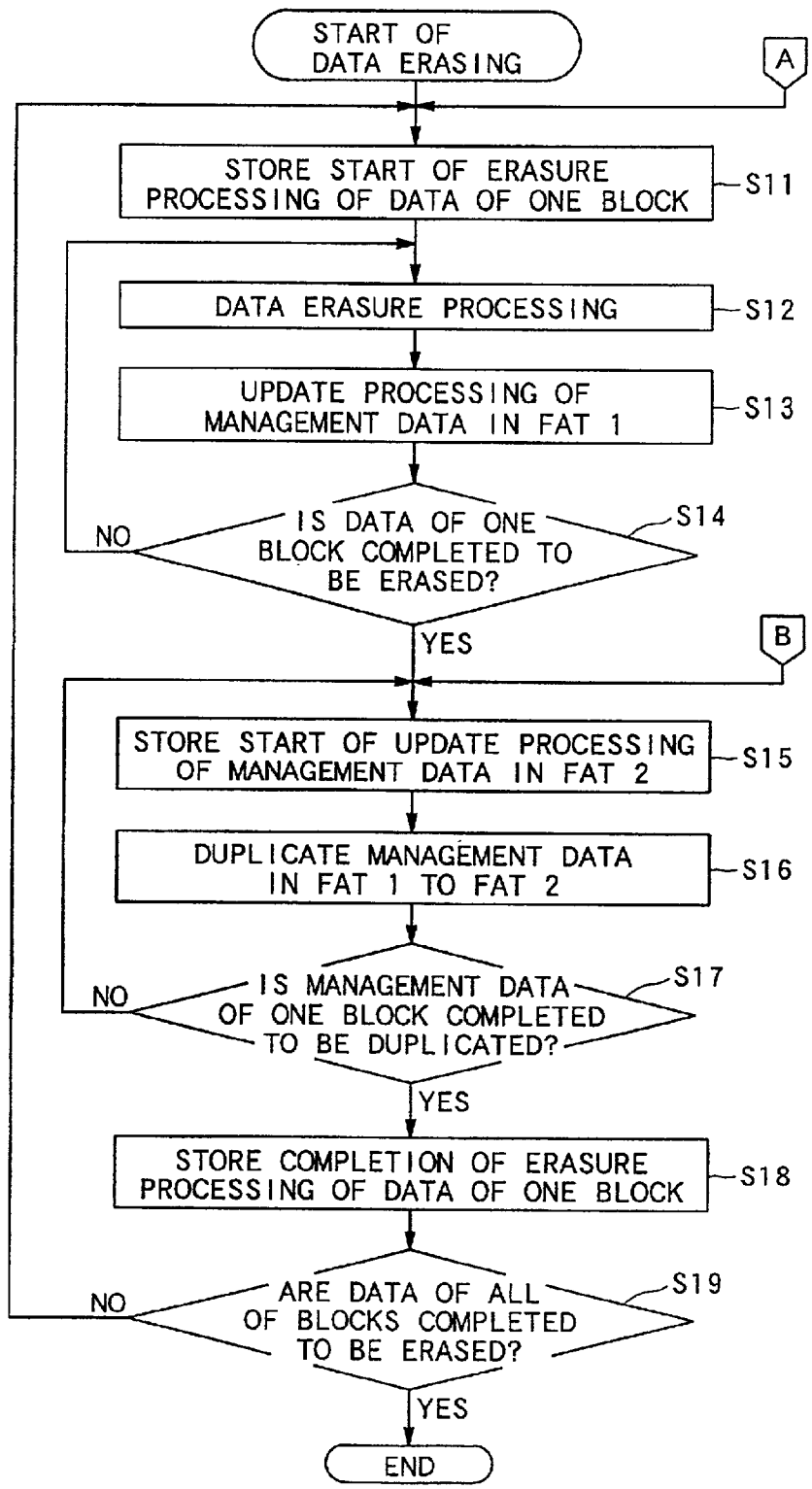
FIG. 9 is a flowchart illustrating the control processing in the system controller 40 when the data is erased.
Figure 10:
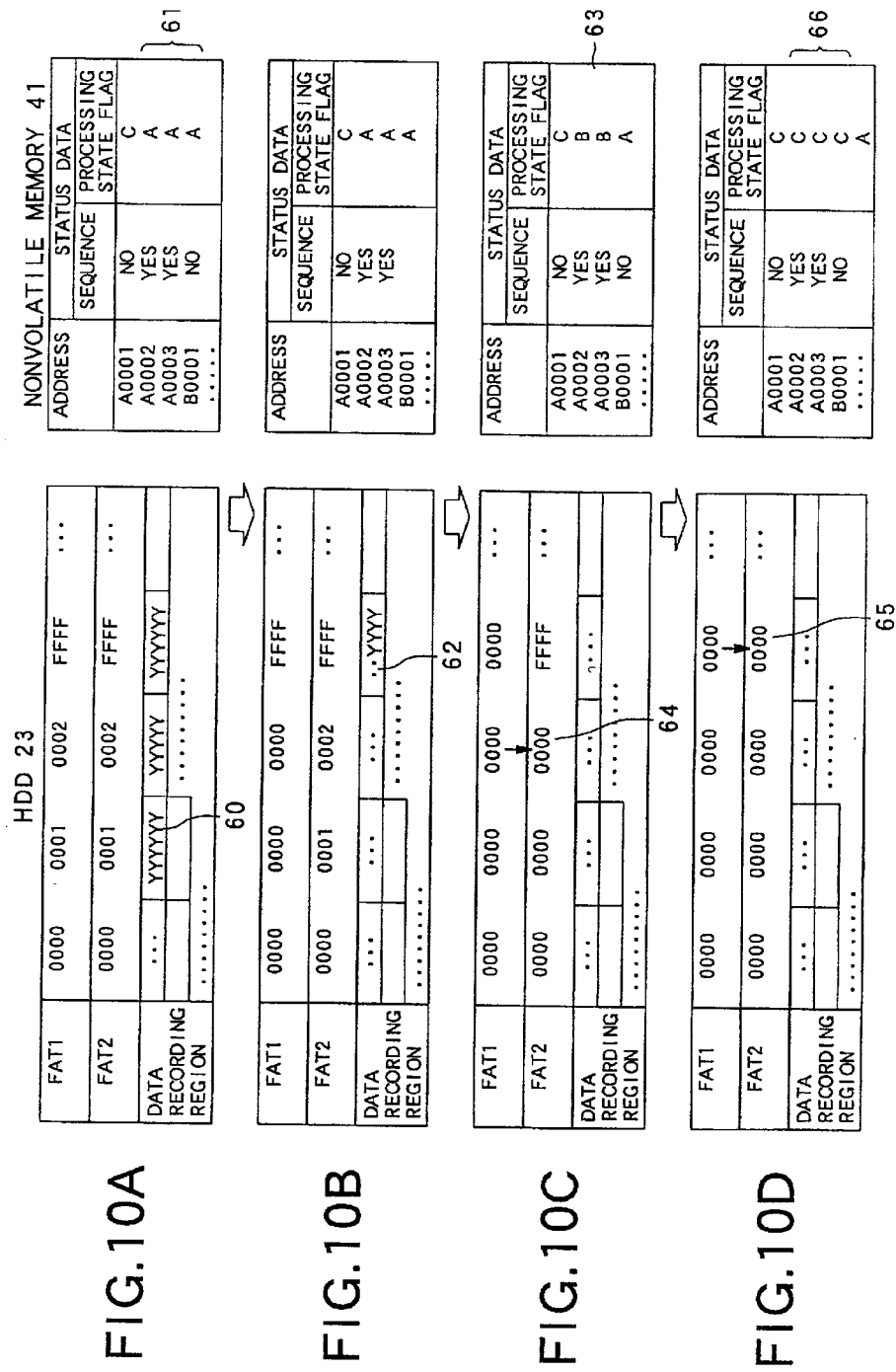
FIGS. 10A to 10D are charts conceptually illustrating the data erasing and the management data updating in the HDD 23 in the processing illustrated in FIG. 9 and the status data storing in the nonvolatile memory 41.

FIG. 9 is a flowchart illustrating the control processing in the system controller 40 when the data is erased; and FIGS. 10A to 10D are charts conceptually illustrating the data erasing and the management data updating in the HDD 23 in the processing illustrated in FIG. 9 and the status data storing in the nonvolatile memory 41. Incidentally, the audio data "YYYY . . . " in the above-described stream unit is exemplified in the following description, similarly to the above-described data recording case.

Furthermore, although the present embodiment will be explained on the case where the data is completely erased from the data recording region, it is not limited to such a case. For example, the present invention can be applied to the configuration in which the data is considered to be erased even if the data remains in the data recording region.

In the control processing illustrated in FIG. 9, the system controller 40 starts a data erasing processing in accordance with a data erasing instruction input by the user via the operation/display 42, and further, stores the processing state flag ("A") indicating the start of the erasing processing of data of one block in the nonvolatile memory 41 (step S11). For example, as designated by reference numeral 61 in FIG. 10A, the processing state flag "A" corresponding to each of the clusters (the addresses A0002, A0003 and B0001) in one block to be erased is stored in the nonvolatile memory 41. Here, in the example illustrated in FIG. 10A, the data is started to be erased from the data recording region in the HDD 23 from the cluster (the address A0002) designated by reference numeral 60.

Subsequently, the system controller 40 performs an erasure processing for erasing data from the data recording region in the HDD 23 (step S12), and then, it performs an update processing for updating the management data in the FAT 1 corresponding to the above-described data (step S13). For example, as illustrated in FIG. 10B, when the data "YYYYY" in a first cluster in the block concerned is erased, the management data in the FAT 1 corresponding to the above-described data is updated from "0001" (indicating the data having the sequence) to "0000" (indicating that no data is recorded). The sequence corresponding to the address A0002 becomes "YES".

Next, the system controller 40 judges as to whether or not the data of one block is completed to be erased (step S14). Unless the data of one block has been completed to be erased, the routine returns to step S12, in which next data is subjected to the erasure processing. For example, since the sequence of the cluster at the address A0002 is "YES", the data "YYYYYY" is erased in a second cluster (i.e., the address A0003) of the block concerned, and then, the management data in the FAT 1 corresponding to the above-described data is updated from "0002" (indicating the data having the sequence) to "0000", as illustrated in FIG. 10B. Thus, the sequence corresponding to the address A0003 becomes "YES".

In the meantime, if the data of one block has been completed to be erased, the routine proceeds to step S15. For example, when the data in a last cluster designated by reference numeral 62 in FIG. 10B is completed to be erased and the management data in the FAT 1 corresponding to the above-described data is updated, the sequence in the status data is recorded as "NO", and thus, the routine proceeds to step S15. Here, based on "NO" of the sequence of the status data, it is judged as to whether or not the data of one block is completed to be erased and the management data in the FAT 1 is completed to be updated.

In step S15, the system controller 40 stores a processing state flag "B" indicating a start of an update processing for updating the management data in the FAT 2 in the nonvolatile memory 41. And then, the system controller 40 duplicates the management data in the FAT 1 to the FAT 2 (step S16). For example, when the processing state flag "B" at the address A0003 is stored, as designated by reference numeral 63 in FIG. 10C, the management data in the FAT 1 corresponding to the address A0003 is duplicated to the FAT 2, as designated by reference numeral 64.

In step S17, the system controller 40 judges as to whether or not the management data of one block is completed to be duplicated to the FAT 2. If the management data is completed to be duplicated, the routine proceeds to step S18. In contrast, unless the management data has been completed to be duplicated, the routine is repeated in steps S15 and S16 until all of the management data of one block are completed to be updated to the FAT 2.

In step S18, the system controller 40 stores, in the nonvolatile memory 41, a processing state flag "C" indicating the completion of the erasure processing of the data of one block (i.e., the erasure processing in the data recording region and the up date processing in the FAT 1 and the FAT 2). For example, in the case where the management data in the FAT 1 corresponding to the address B0001 is duplicated to the FAT 2, as designated by reference numeral 65 in FIG. 10D, the processing state flag "C" corresponding to each of the clusters (the addresses A0002, A0003 and B0001) in one block to be erased is stored in the nonvolatile memory 41, as designated by reference numeral 66.

Subsequently, the system controller 40 judges as to whether or not the data of all of the blocks to be erased are completed to be erased (step S19). Unless the data of all of the blocks have been completed to be erased, the routine returns to step S11, and then, the data of a next block is subjected to the same processing as described above (i.e., from steps S11 to S18). In contrast, if the data of all of the blocks have been completed to be erased, the routine comes to an end.

Figure 11:
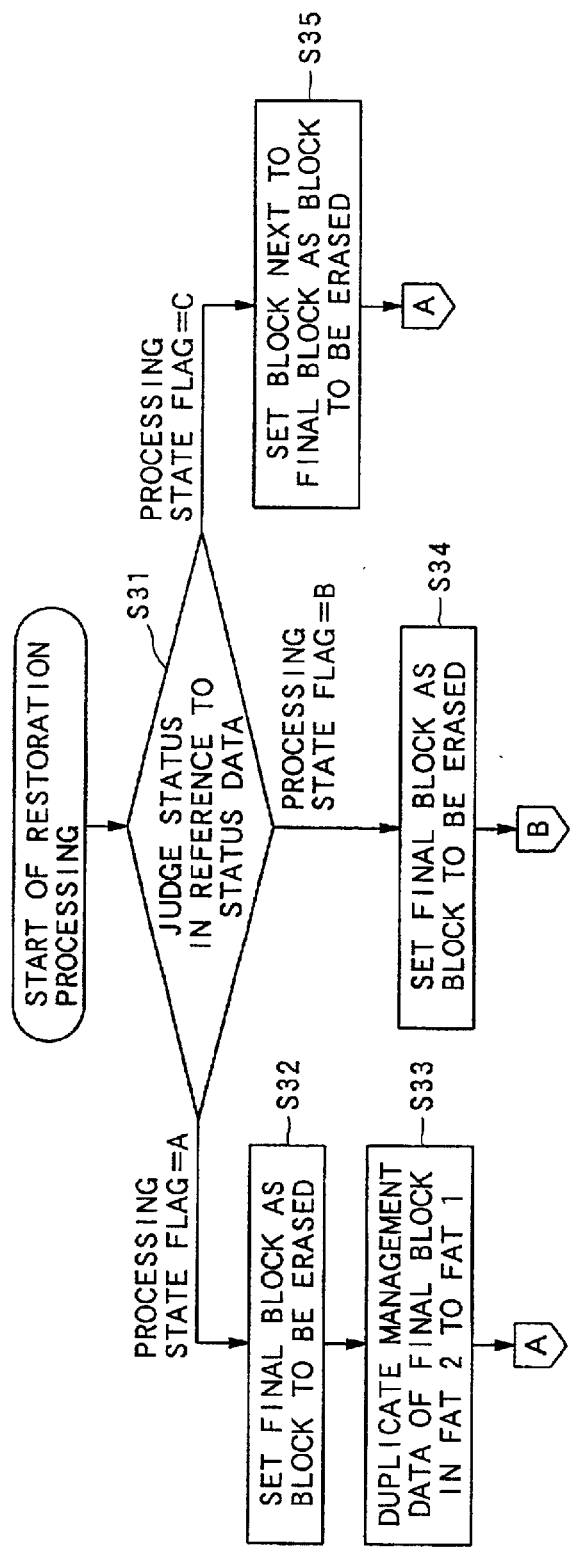
FIG. 11 is a flowchart illustrating a restoration processing by the system controller 40 in the case where the trouble of the power supply such as the power shutdown occurs during the data erasing.

Next, referring to FIGS. 11 to 13, a description will be given below of restoring measures by the system controller 40 in the case where the trouble of the power supply such as the power shutdown occurs during the control processing by the system controller 40 at the time of the above-described data erasing, and thereafter, the trouble of the power supply is solved. FIG. 11 is a flowchart illustrating a restoration processing by the system controller 40 in the case where the trouble of the power supply such as the power shutdown occurs during the data erasing; FIGS. 12A to 12C are charts conceptually illustrating the data erasing and the management data updating in the HDD 23 and the status data storing in the nonvolatile memory 41 in the case where the system controller 40 performs the restoration processing after the trouble of the power supply such as the power shutdown has occurred while the data is erased from the data recording region; and FIGS. 13A to 13C are charts conceptually illustrating the data erasing and the management data updating in the HDD 23 and the status data storing in the nonvolatile memory 41 in the case where the system controller 40 performs the restoration processing after the trouble of the power supply such as the power shutdown has occurred while the management data is duplicated from the FAT 1 to the FAT 2.

When the trouble of the power supply such as the power shutdown occurs during the data erasing, and thereafter, the trouble is solved, the system controller 40 starts the restoration processing. In the restoration processing, first, the system controller 40 refers to the status data stored in the nonvolatile memory 41, and then, judges the processing status of the final block being erased (step S31). Specifically, in the case where all of the processing state flags corresponding to the blocks concerned are "A", the routine proceeds to step S32. Otherwise, in the case where the processing state flags corresponding to the blocks concerned include "B", the routine proceeds to step S34. Alternatively, in the case where all of the processing state flags corresponding to the blocks concerned are "C", the routine proceeds to step S35.

For example, in the case where the trouble of the power supply such as the power shutdown occurs while the data is erased from the data recording region, all of the processing state flags corresponding to the final blocks (the addresses A0002, A0003 and B0001) are "A", as illustrated in FIG. 12A. In this case, the routine proceeds to step S32, in which the system controller 40 sets the above-described final blocks as blocks to be erased, and then, it controls to resume the erasing from the above-described final blocks. Subsequently, the system controller 40 duplicates, to the FAT 1, all of the management data of the final block in the FAT 2 (step S33), that is, returns the management data in the FAT 1 and the status data in the nonvolatile memory 41 to the state in which the final block is started to be erased, as illustrated in FIG. 12B. Thus, the routine proceeds to step S11 illustrated in FIG. 9, as described above. In this manner, the data is resumed to be erased from the cluster corresponding to the first address A0002 in the final block, as illustrated in FIG. 12C.

In the meantime, in the case where the trouble of the power supply such as the power shutdown occurs during the duplication of the management data from the FAT 1 to FAT 2, "B" is contained in any of the processing state flags corresponding to the final blocks (the addresses A0002, A0003 and B0001), as illustrated in FIG. 13A. In this case, the routine proceeds to step S34, in which the system controller 40 sets the above-described final block as a block to be erased, and then, controls to update the management data in the FAT 2 from the above-described final block. At this time, the status data stored in the nonvolatile memory 41 is returned to the state before the FAT 2 is updated.

Subsequently, the routine by the system controller 40 proceeds to step S15 illustrated in FIG. 9. Thus, the processing is resumed from the duplication of the management data from the FAT 1 to the FAT 2 in the final block, as illustrated in FIGS. 13B and 13C.

In contrast, in the case where the trouble of the power supply such as the power shutdown occurs immediately after the processing state flag "C" indicating the completion of the erasure processing of the data of one block is stored in the nonvolatile memory 41, all of the processing state flags corresponding to the final blocks are "C". In this case, the routine proceeds to step S35, in which the system controller 40 sets a block next to the above-described final block as a block to be erased, and then, controls to resume the erasing from the next block. Subsequently, the routine by the system controller 40 proceeds to step S11 illustrated in FIG. 9. Thus, the erasing is resumed from the data of the block next to the final block.

Here, although the explanation has been made in FIG. 4 in which the data of one stream unit is considered as one block, the same goes for the case where the data of one cluster unit is considered as one block (in the same manner as in FIG. 9).

Furthermore, in the example in FIG. 5 as described above, the management data in the FAT 1 is updated after the data (designated by reference numeral 50) of the first cluster is recorded, and then, the data in the next cluster is recorded. However, the management data in the FAT 1 may be updated after the data of all of the clusters in one block per stream are recorded (in the same manner as in FIG. 10).

As described above, even if according to the present embodiment, the trouble of the power supply such as the power shutdown occurs during the data record or erasure processing, the status in each of the steps of the control processing is stored as the status data, so that the data recording or erasing status can be grasped after the restoration of the power, thereby properly performing the restoration processing per block at a high speed during the data record or erasure processing.

Incidentally, although in the above-described preferred embodiment, the explanation has been made mainly on the case one block is considered as the cluster or stream unit, it is not limited to this. The unit of such one block may be arbitrarily set, and therefore, a plurality of streams may be regarded as one block.

Furthermore, although in the above-described preferred embodiment, the record and erasure processing of the data, and the duplication processing of the management data at the time of the restoration processing have been configured such that they have been performed per block, it may be performed, for example, per cluster in the case where one block is considered as one stream. For example, in the example as illustrated in FIG. 7, the record processing may be resumed from the cluster concerned in the restoration processing in the case where the power shutdown occurs immediately after the data "YY" is recorded.

Moreover, although the above-described preferred embodiment is configured such that the nonvolatile memory is provided for storing the status data, a volatile memory and a backup battery or the like in place of the nonvolatile memory may be combined with each other, so as to store the status data in the volatile memory. Such a configuration can produce the same effect as described above.

Additionally, no nonvolatile memory may be provided, and the status data may be stored in a predetermined storage region in the HDD, thereby producing the same effect as described above.

In addition, although the HDD 23 is used as the recording device, it is not limited to this, for example, a memory stick (card-type recording medium) or the like may be used.

Furthermore, although the above-described preferred embodiment has been described in the case where the present invention has been applied to the audio apparatus, it is not limited to this. The present invention may be applied to other electronic equipment such as a video apparatus or a personal computer.

As explained above, the data recording apparatus or the data erasing apparatus according to the present invention is configured such that the status data indicating the control processing status is stored in the predetermined unit by the control device, so that restoring measures can be taken in reference to the status data in the predetermined unit even if the trouble of the power supply such as the power shutdown occurs during, for example, the data record or erasure processing, thereby accurately restoring the data in a short time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-167942 filed on Jun. 4, 2001 including the specification, claims, drawings and summary is incorporated herein by reference in its entirety.

What is claimed is:

1. A data recording apparatus, comprising:
   a recording device which includes a data recording region having data recorded in a predetermined unit, a first management data region having management data with respect to the data recorded an the data recording region, stored in the predetermined unit, and a second management data region having the same management data as that stored in the first management data region, stored in the predetermined unit;
   a control device which performs, in the predetermined unit, control processing including a record processing for recording data in the data recording region and an update processing for updating management data in the first management data region and the second management data region, which stores status data indicating a start of the record processing in the memory when the record processing is started, and which stores status data indicating a start of the update processing in the memory when the update processing for updating the management data in the second data management region, is started; and
   a memory which stores status data indicating a control processing status in the predetermined unit by the control device.

2. The data recording apparatus according to claim 1, wherein the control device updates the management data stored in the first management data region by the predetermined unit as the data in the predetermined unit is recorded in the data recording region, and further, updates the management data stored in the second management data region by the predetermined unit to the same management data as the updated management data stored in the first management data region.

3. The data recording apparatus according to claim 2, wherein the control device stores status data indicating a current processing status in the memory during the control processing.

4. The data recording apparatus according to claim 3, wherein the control device refers to the status data recorded in the memory, and then, resumes the control processing in accordance with the processing status in the case where a trouble including a shutdown of power supply during the control processing occurs and the trouble is solved.

5. The data recording apparatus according to claim 4, wherein the control device duplicates the management data stored in the second management data region to the first management data region, and then, resumes the control processing in the case where the processing status indicates the start of the record processing.

6. The data recording apparatus according to claim 4, wherein the control device duplicates the management data stored in the first management data region to the second management data region, and then, resumes the control processing in the case where the processing status indicates the start of the update processing.

7. The data recording apparatus according to claim 1, wherein the control device stores status data indicating an end of the update processing in the memory in the case where the update processing for updating the management data in the second management data region, is ended.

8. A data erasing apparatus, comprising:
   a recording device which includes a data recording region having data to be erased in a predetermined unit, a first management data region having management data with respect to the data recorded in the data recording region, stored in the predetermined unit, and a second management data region having the same management data as that stored in the first management data region, stored in the predetermined unit;
   a control device which performs, in the predetermined unit, control processing including an erasure processing for erasing data from the data recording region and an update processing for updating management data in the first management data region and the second management data region, which stores status data indicating a start of the erasure processing in the memory when the erasure processing is started, and which stores status data indicating a start of the update processing in the memory when the update processing for updating the management data in the second data management region, is started; and
   a memory which stores status data indicating a control processing status in the predetermined unit by the control device.

9. The data erasing apparatus according to claim 8, wherein the control device updates the management data stored in the first management data region by the predetermined unit as the data in the predetermined unit is erased from the data recording region, and further, updates the management data stored in the second management data region by the predetermined unit to the same management data as the updated management data stored in the first management data region.

10. The data erasing apparatus according claim 9, wherein the control device stores status data indicating a current processing status in the memory during the control processing.

11. The data erasing apparatus according to claim 10, wherein the control device refers to the status data recorded in the memory, and then, resumes the control processing in accordance with the processing status in the case where a trouble including a shutdown of power supply during the control processing occurs and the trouble is solved.

12. The data erasing apparatus according to claim 11, wherein the control device duplicates the management data stored in the second management data region to the first management data region, and then, resumes the control processing in the case where the processing status indicates the start of the erasure processing.

13. The data erasing apparatus according to claim 11, wherein the control device duplicates the management data stored in the first management data region to the second management data region, and then, resumes the control processing in the case where the processing status indicates the start of the update processing.

14. The data erasing apparatus according to claim 8, wherein the control device stores status data indicating an end of the update processing in the memory in the case where the update processing for updating the management data in the second management data region, is ended.

* * * * *